Patented Feb. 10, 1942

2,272,396

UNITED STATES PATENT OFFICE 2,272,396

RUBBER COMPOUND AND METHOD OF MAKING SAME

Harold Becher, John Ross, and Jacob Stein, New York, N. Y., assignors, by direct and mesne assignments, to Antiseptics, Inc., New York, N. Y., a corporation of New York No Drawing. Application February 25, 1935, Serial No. 8,146

5 Claims. (Cl. 260—768)

Our invention relates to new and improved rubber compounds or products, and to a new and improved method of making the same. While we prefer to use our improved method for making the novel product or products, the claims for said product or products are not to be limited to any particular method of making the same.

One of the objects of our invention is to produce a large range of rubber compounds or products, in which the chemical structure of the rubber has been modified, so that the rubber product, or the surface or outer part thereof, is given antiseptic or alkaline or germicidal properties, or other desirable properties.

Another object of our invention is to produce such product or products, whereby the rubber can be given a large series of colors by chemically modifying the rubber addition compound, as distinguished from adding coloring matter (such as a pigment or pigments) to the rubber mix.

Another object of our invention is to produce a modified rubber which shall have long life, and which can be used for all purposes for which rubber can now be used, and more particularly, in making garments, parts of garments, wearing apparel, bed-sheets, hot-water bags, and devices or appliances used in medicine or surgery.

Another object of our invention is to produce a rubber which will deodorize fecal matter and odors due to fermentation of body secretions.

Another object of our invention is to produce a rubber compound in which the rubber molecule or unit, which is ordinarily considered as being $C_5H_8$, is combined with aliphatic or aryl residues through a sulphur linkage, as the type R—S—X, the R group being the rubber residue, the S group being a sulphur atom, the X group being an aliphatic or aromatic residue.

Additional objects and additions and modifications of our invention will be set forth in the following description.

*Example No. 1*

As a specific example of one of the numerous embodiments of our invention, uncured rubber may be treated with monothiohydroquinone chloride. This is generally referred to as p-hydroxy-benzene-sulphenyl-chloride. This substance is soluble in carbon disulphide or other solvents such as ethylene dichloride.

We may use a 2% solution (by weight). While this substance may be made in various ways, it can also be made by dissolving the monothiohydroquinone in carbon disulphide, and then dissolving sulphur chloride in said solvent. It is to be understood that when specific figures are given, they are stated only as examples, and without limiting the invention.

The rubber, which may be vulcanized, is treated with a solution of said para-hydroxy-benzene-sulphenyl-chloride by immersing the rubber in said solution. The solvent in said solution may be any suitable substance, such as carbon disulfide, ethylene-dichloride, etc. This treatment may be carried out at room temperature or at temperatures as low as 40° F. The solution may contain sulphur monochloride in excess of the theoretical amount required to convert monothiohydroquinone to para-hydroxy-benzene-sulphenyl-chloride. The rubber may be pure sheet rubber or it may contain any suitable filler or fillers, or added materials of any type. The solvent is removed by evaporation. As proof that a reaction between para-hydroxy-benzene-sulphenyl-chloride and the rubber molecule has taken place, the rubber may be immersed in a solution of diazonium salt, such as para-tolidine diazonium chloride. After being in contact with this solution for a few minutes, if the rubber is removed and washed with organic solvents, dilute caustic soda and hydrochloric acid, it is found that the color is not removable. If ordinary rubber is so treated, the color is removed. This is clear proof that the residue of the para-hydroxy-benzene-sulphenyl-chloride was attached to the rubber, as it reacted with the diazonium salt to produce a dye which could not be removed by the agents above mentioned.

The vulcanized sheet has the desirable properties of ordinary vulcanized rubber, and the surface thereof has the desired antiseptic properties due to the presence of the phenolic hydroxy group. Tests have shown that rubber which has been thus treated can be washed with pure ethylene dichloride, or said rubber can be treated with dilute sodium hydroxide solution so as to form a sodium salt, or said rubber can be washed with dilute hydrochloric acid without destroying the properties which have been imparted to the rubber, by the chemical combination of the thio-hydroquinone nucleus with the rubber.

*Example No. 2*

When the rubber is to be sprayed, we may use carbon disulphide in which one per cent of monothiohydroquinone (by weight) and one per cent (by weight) of sulphur monochloride have been dissolved. After spraying and drying, the rubber may be air-cured in the usual manner. The sulphur monochloride reacts with the monothiohydroquinone so as to produce the para-hydroxy-benzene-sulphenyl-chloride.

*Example No. 3*

Instead of using monothiohydroquinone chloride (p-hydroxy-benzene-sulphenyl-chloride), we can use monothiohydroquinone bromide (p-hydroxy-benzene-sulphenyl-bromide) in which the hydrogen in the SH group is replaced by bromine, thus giving a grouping SBr. This compound can be used with or without the simultaneous use of sulphur chloride, according to the respective examples previously given.

*Example No. 4*

The halogenated monothiohydroquinone, either in undissolved form, or dissolved in carbon disulphide, can be intermixed with the uncured rubber, as by milling. Likewise, the substance or substances specified herein can be intermixed with latex, or with an artificial rubber dispersion, in any desired percentage, such as one-half to ten per cent of the weight of the rubber, this proportion being based on the weight of the dry rubber secured from the dispersion. The latex or other dispersion can be partially or wholly prevulcanized, or it may contain any suitable vulcanizing agent and active accelerators, so that it is vulcanized when it dries, or it vulcanizes very rapidly.

After one of the substances above specified has been intimately mixed and caused to react with a rubber mass or sheet, said rubber mass or sheet can be vulcanized by means of sulphur monochloride. If the rubber is vulcanized by means other than sulphur monochloride, the rubber which contains the thio-hydroquinone can be exposed to chlorine or to bromine vapor, so as to change the thio-hydroquinone as previously specified, and produce a chemical linkage.

Instead of using carbon disulphide as a solvent, we can use any other suitable solvent, such as carbon tetrachloride. We do not wish to be limited to the chlorinated solvents. It will be noted that we prefer to use solvents such as carbon disulphide in which rubber is soluble, so that the solutions of the materials which react with the rubber, penetrate the surface of the rubber sheet.

The halogen is derived from the sulphur chloride, when this is used.

The organic radical "R" may be an alphyl radical, such as $CH_3$, or $C_2H_5$ or $C_3H_7$, etc. Said radical may be isocyclic such as phenyl ($C_6H_5$), and the other radicals of naphthenes, benzene derivatives, etc. Said organic radical may be heterocyclic, such as thiazole, pyridine, benzthiazol, etc.

The said radicals also include their substitution products, for example, $CH_2OH$, $CH_2Cl$; phenol, phenol sulphonic acid, amino derivatives, etc.; oxythiazole, oxyquinoline, etc.

The modified rubber molecule or unit retains its typical rubber properties, and it also takes on (at least in part) the chemical and physical nature or properties of the added nucleus or group, which is preferably organic.

The nature of the final rubber product depends upon the added group, the type of vulcanization (hot or cold, steam or hot air), the pressure and temperature used during vulcanization, etc. The final product may be a vulcanized and elastic sheet rubber, which can be used for making corsets, sanitary garments, children's garments, bed sheets, etc. Fabrics or cords may be impregnated with or surfaced with one of the improved products, for making garments, tires, etc. Said products may be formed into a material like "Lastex."

The products may be made hard or chemically resistant. They may be made in a form similar to "ebonite" by adding enough sulphur during vulcanization. Products can be made which can be mechanically worked, such as by means of drills, lathes, etc. The products can be made so as to take on a high polish. The rubber may be treated in the form of particles, or be reduced to particles or powder after treatment, and said powder can be used for molding objects.

Another important feature of our invention is that the rubber can be changed, either through or at its surface so as to produce a color effect, by the formation of a coloring matter, of any desired color or design.

For example, the nucleus which is first added to the rubber may be a hydroxy derivative or an amino derivative of benzene, naphthalene, etc., having an "SX" group. By further treatment with a diazotized solution of any suitable amine derivative or any suitable aniline derivative, an azo dye will be formed which is chemically part of the rubber.

For example, the rubber which has been treated with a solution (as for example, in carbon disulphide) of monothiohydroquinone and sulphur chloride, and dried and neutralized in an ammonia gas atmosphere, is given a surface treatment with dilute caustic soda solution in water. It is then washed with pure water so as to remove excess caustic soda solution, and the rubber is then placed for one minute in a dilute solution of ortho-tolidine diazonium chloride, and again washed with pure water. The surface of the rubber is thus dyed a deep rich yellow. Rubber colored in this manner is used in making of colored resins and pigments. Tests have shown that colored rubber which has been thus prepared, has its color fast to the action of a 5% aqueous solution of sodium hydroxide, dilute hydrochlorice acid, and acetone. This reaction can be used for identifying the new addition compound of rubber and an antiseptic which has a phenolic hydroxy group. When said addition compound is reacted with a diazonium salt, a colored rubber compound is secured, which is resistant to reagents which can dissolve or attack the azo-dye which is made by reacting the compound which has the phenolic hydroxy group and said diazonium salt.

When the rubber is to be rendered antiseptic, we prefer to attach to the rubber nucleus, a suitable substituted thiophenol, as the aromatic nucleus.

In order to impart analgesic properties to the rubber, we can attach groups such as the menthols, alkyl quinolines, codeine, barbiturics, thiazols, sulphonals.

Whenever we refer to rubber, we intend to include rubber-like substances, such as balata, guttapercha, and artificial or synthetic rubbers.

The vulcanized rubber which has been made according to the various embodiments of our method can be recognized by various tests, dependent upon the nature of the linked compound. If the linked compound is a phenol, the rubber shows phenolic and/or antiseptic properties, characterized by being chemically combined with the rubber instead of or as distinct from a mechanical mixture. This applies to the other linked substances.

We have given numerous examples of our invention, in order to avoid being limited to the substances and the details specified herein, and various additions and modifications will occur readily to one skilled in the art. For example, the added substance may be prepared previous to adding it to the rubber. For example, the monothiohydroquinone may have the hydrogen in its "SH" group replaced by a halogen, and said substance could be directly added to the rubber, in solution form or directly. Sulphur in any desired proportion may be added to the rubber prior to, or subsequent to, or simultaneously with, the addition of said organic addition.

Indeed, it is clear that when monothiohydroquinone and sulphur chloride are dissolved in a suitable solvent, as previously described, the hydrogen in the "SH" group is replaced by the chlorine, excess sulphur chloride remaining in solution in order to secure wet and cold vulcanization. The uncured rubber sheet or mass, prior to the treatment specified in Example No. 1 or in any of the other examples, may have any desired proportion of sulphur or other vulcanizing agent added thereto, and accelerators or the like may also be added prior to the linking of the rubber molecule with the added organic radical.

We refer to the novel products in some of the claims as articles of manufacture, as this is a broader term than "composition of matter," and we do not wish to be limited to any specific composition.

We can also form addition compounds of rubber and other organic "thio" compounds, in which one or more "SH" groups has been changed to an "SX" group. For example we can use various acids containing an ACl group.

We can also use halogen derivatives of dithiocarbamates having an "SCl" group.

Other acid chlorides can be used, as for example: $OH.C_6H_4SOCl$; $ClSC_6H_4SO_2OH$; and other derivatives of chlorsulfonic, chlorsulfinic and chlorsulfenic acids.

The theory of the method or methods previously specified is as follows:

In the above mentioned compounds, the chlorine causes the organic compound to combine with the rubber by generating sufficient molecular heat to produce an addition compound of which the organic radical is a constituent.

It is absolutely new to cause rubber to react with halogenated organic compounds of the type in which the halogen can produce addition compounds of the organic radicle with the rubber.

We have given numerous examples of various types of organic compounds which can be used for making the improved product and for using the improved method but we do not wish to be limited to the same as we have given numerous examples in order to avoid being limited to any particular type of organic compound.

We prefer to form the improved rubber compounds by allowing rubber to react with an organic compound having a group selected from the "SX" group, where X represents halogen, the halogen in such groups being sufficiently active to allow combination with the rubber without the use of any substantial external heat. However, other organic compounds can be utilized with the use of a temperature sufficiently high to cause combination, and without decomposing the organic compound which is being added to the rubber unit.

We have cited examples of the addition of compounds containing a terminal group SCl, and we have demonstrated that this type of compound reacts with unsaturated linkages, specifically those contained in the rubber. We have also shown that the radical which is attached to the halogen may be any nucleus which has germicidal, antiseptic and other properties and the ability to unite with other molecules which will cause the formation of highly colored substances.

Whenever we refer to rubber which has antiseptic properties, we refer to a material which can prevent infection or which can arrest the multiplication of harmful bacteria.

We have shown numerous preferred embodiments of our invention, but it is clear that numerous changes and omissions can be made without departing from its spirit.

When a rubber addition compound made according to the invention is caused to contact with body emissions, a surface antiseptic effect is secured. In order to distinguish the invention herein, from that set forth in our copending application Ser. No. 121,558, the rubber compounds made according to the invention herein may be designated as "covalent" in accordance with modern chemical terminology, as distinguished from the electrovalent compounds set forth in said copending application. The electrovalent compounds ionize, like the polar compounds, which includes acids, salts, and bases. The covalent compounds are stable towards dissociating agents. Methane is an example of a covalent compound. The electrovalent compounds specified in said copending application dissociate into ions under the influence of hydrolytic agents, such as the body emissions, the anion being a rubber compound, and the cation being an antiseptic. In the covalent compounds set forth herein, the substance which has the phenolic hydroxy group is linked to the sulphur (for example) and the sulphur is linked to the rubber with covalent linkages. Hence the covalent rubber compounds made according to this invention cannot be dissociated by means of normal ionizing media, such as by acids and alkaline solutions. The antiseptic substance is combined with the rubber through what may be designated as an ether linkage, said ether linkage being secured either through sulphur or through oxygen.

We claim:

1. A vulcanized addition compound of rubber and an organic antiseptic which has a thiohalide group having a phenolic hydroxy group, said compound having a surface antiseptic effect when in contact with body emissions.

2. A vulcanized compound of rubber and an organic antiseptic selected from a class which consists of thiohalides of organic compounds which have a phenolic hydroxy group, said compound having a surface antiseptic effect when in contact with body emissions.

3. The vulcanized addition compound of rubber and para-hydroxy-benzene-sulphonyl-chloride, said product having an antiseptic surface action when in contact with body emissions.

4. A method of making an addition compound of rubber which consists in reacting rubber with para-hydroxyl-benzene-sulphonyl-chloride in solution, the para-hydroxyl-benzene-sulphonyl-chloride being present in sufficient proportion so that said compound has a surface antiseptic effect when in contact with body emissions.

5. A method of making an antiseptic addition compound of rubber which consists in reacting vulcanized rubber with para-hydroxyl-benzene-sulphonyl-chloride in sufficient proportion so that said addition compound has a surface antiseptic effect when in contact with body emissions.

HAROLD BECHER.
JOHN ROSS.
JACOB STEIN.